(12) United States Patent
Robinson et al.

(10) Patent No.: US 9,230,075 B1
(45) Date of Patent: *Jan. 5, 2016

(54) MULTI-SERVER AUTHENTICATION USING PROACTIVIZATION JOURNALING

(75) Inventors: Peter Robinson, Enoggera Reservoir (AU); Jaimee Brown, Fortitude Valley (AU); Eric Young, Brisbane (AU)

(73) Assignee: EMC Corporation, Hopkinton, MA (US)

( * ) Notice: Subject to any disclaimer, the term of this patent is extended or adjusted under 35 U.S.C. 154(b) by 407 days.

This patent is subject to a terminal disclaimer.

(21) Appl. No.: 13/600,641

(22) Filed: Aug. 31, 2012

(51) Int. Cl.
*G06F 21/31* (2013.01)
*H04L 29/06* (2006.01)

(52) U.S. Cl.
CPC .............. *G06F 21/31* (2013.01); *H04L 63/083* (2013.01); *G06F 2221/2143* (2013.01)

(58) Field of Classification Search
CPC .......... H04L 9/08; H04L 9/0816; H04L 9/085
See application file for complete search history.

(56) References Cited

U.S. PATENT DOCUMENTS

| 5,625,692 | A * | 4/1997 | Herzberg et al. ............. 380/286 |
| 7,725,730 | B2 | 5/2010 | Juels et al. |
| 2004/0030932 | A1 * | 2/2004 | Juels et al. ..................... 713/202 |
| 2004/0117649 | A1 * | 6/2004 | Whyte ........................... 713/200 |
| 2011/0246817 | A1 * | 10/2011 | Orsini et al. .................. 714/6.1 |

OTHER PUBLICATIONS

Lidong Zhou et al., APSS: Proactive Secret Sharing in Asynchronous Systems, Aug. 2005.*
U.S. Appl. No. 13/404,737, filed Feb. 24, 2012, titled "Methods and Apparatus for Authenticating User Using Multi-Server One-Time Passcode Verification."
Herzberg et al., Proactive Secret Sharing, or: How to Cope with Perpetual Leakage, Advances in Cryptology—Crypto 95 Proceedings, Lecture Notes in Computer Science, vol. 963, D. Coppersmith ed., Springer-Verlag, 339-352 (1995).

* cited by examiner

*Primary Examiner* — Peter Poltorak
*Assistant Examiner* — Huan V Doan
(74) *Attorney, Agent, or Firm* — Ryan, Mason & Lewis, LLP

(57) ABSTRACT

Secret values used in a multi-server authentication scheme are updated. Information is authenticated in a system comprising a plurality of processing devices each adaptable for communication with one or more other devices. The information is authenticated by generating at least first and second shares of a first password associated with a first device (such as a client device); storing the first and second shares in respective second and third devices (such as authentication server devices); updating the first and second shares using a secret value T; assigning a version number to the updated first and second shares; and upon submission of additional information associated with the first device to at least one of the second and third devices, the second and third devices utilizing the respective updated first and second shares for a given version number to collectively determine a correspondence of the additional information with the first password.

23 Claims, 3 Drawing Sheets

| SECRET VALUE | 400-RED | | 400-BLUE | |
|---|---|---|---|---|
| | VERSION N | VERSION N+1 | VERSION N | VERSION N+1 |
| SECRET1 | S1PredVersN | S1PredVersN+1 | S1PblueVersN | S1PblueVersN+1 |
| SECRET2 | S2PredVersN | | S2PblueVersN | S2PblueVersN+1 |
| SECRET3 | S3PredVersN | | S3PblueVersN | S3PblueVersN+1 |

US 9,230,075 B1

MULTI-SERVER AUTHENTICATION USING PROACTIVIZATION JOURNALING

CROSS-REFERENCE TO RELATED APPLICATION

The present application is related to U.S. patent application Ser. No. 13/600,676, entitled "Multi-Server Authentication Using Personalized Proactivization," filed contemporaneously herewith and incorporated by reference herein.

FIELD OF THE INVENTION

The present invention relates generally to security techniques for authenticating users over a network or in other types of communication systems, and more particularly to multi-server authentication techniques.

BACKGROUND OF THE INVENTION

In order to gain access to applications or other resources via a computer or another user device, users are often required to authenticate themselves by entering authentication information. Such authentication information may comprise, for example, passwords that are generated by a security token carried by a user. A number of techniques have been proposed or suggested to reduce the susceptibility of authentication systems to attacks. For example, U.S. Pat. No. 7,725,730 discloses secure authentication protocols for authenticating a client device, such as a mobile communications device having limited computational resources, using at least two servers. The two servers utilize information generated from a password to collectively authenticate the client device.

Proactive security techniques update split secret values used by at least two authentication servers. See, for example, A. Herzberg, S. Jarecki, H. Krawczyk, and M. Yung in: Proactive Secret Sharing, or: How to Cope with Perpetual Leakage, Advances in Cryptology—Crypto 95 Proceedings, Lecture Notes in Computer Science, Vol. 963, D. Coppersmith ed., Springer-Verlag, 339-352 (1995). Proactive security protects distributed cryptographic keys using a periodic refreshing of the contents stored by the distributed authentication servers. Generally, if proactive security is employed and an attacker initially breaches one server, and then breaches a second server, the two halves of the secret cannot be combined to form the overall secret.

Proactive security techniques typically require synchronization between authentication servers. A need remains for improved methods for updating the secret values used in a multi-server authentication scheme. A further need remains for improved proactivization methods for updating the secret values in a multi-server authentication scheme that does not require strict synchronization among the various authentication servers.

SUMMARY OF THE INVENTION

Generally, methods and apparatus are provided for updating the secret values used in a multi-server authentication scheme. According to one aspect of the invention, information is authenticated in a system comprising a plurality of processing devices each adaptable for communication with one or more of the other devices. The information is authenticated by generating at least first and second shares of a first password associated with a first device (such as a client device); storing the first and second shares in respective second and third devices (such as authentication server devices); updating the first and second shares using a secret value T; assigning a version number to the updated first and second shares; and upon submission of additional information associated with the first device to at least one of the second and third devices, the second and third devices utilizing the respective updated first and second shares for a given version number to collectively determine a correspondence of the additional information with the first password. The version numbers are optionally monotonically increasing.

The first and second shares can be updated by adding a hashed version of the secret value T to a prior version of the first and second shares. For example, the first and second shares can be updated by applying an exclusive OR function (XOR) to the secret value T and a prior version of the first and second shares. The first or second shares can be updated using the secret value T if a desired version number does not exist.

According to another aspect of the invention, a first portion of a data secret can be stored on a first server with a version number and a second portion of the data secret on a second server with the version number and the first and second portions can be updated using a secret value U. A client first device can be authenticated and provided with the first and second portions for a given version number for reassembly of the data secret.

The authentication techniques of the illustrative embodiments overcome one or more of the problems associated with the conventional techniques described previously, and provide improved security by providing improved techniques for updating secret values in a multi-server authentication environment. Moreover, no modification of the applications or communication protocols is required. These and other features and advantages of the present invention will become more readily apparent from the accompanying drawings and the following detailed description.

DETAILED DESCRIPTION

The present invention will be described herein with reference to an example network-based communication system in which a client communicates over a network with one or more servers. It is to be appreciated, however, that the invention is not restricted to use in this or any other particular system configuration.

Aspects of the present invention provide improved proactivization techniques for updating the secret values used in a multi-server authentication scheme.

Exemplary System

Figure 1:
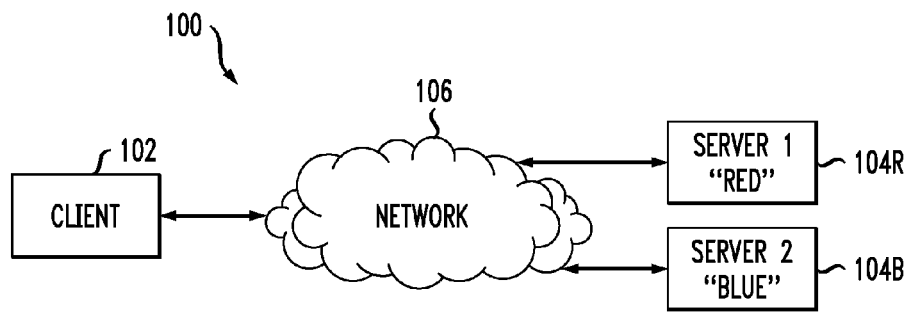
FIG. 1 is a simplified block diagram of an exemplary network environment in which the cryptographic techniques of the present invention may be implemented.

FIG. 1 shows a simplified network-based communication system 100 that will be used to illustrate the secure authentication techniques of the invention. The exemplary system 100 includes a client 102 and first and second servers 104R and 104B, respectively, all of which are configured to communicate over a network 106. For simplicity and convenience of notation, the first and second servers 104R and 104B are also referred to herein as the "Red" and "Blue" servers, respectively, and together comprise an example server pair which implements a portion of a secure authentication protocol in accordance with the invention. The denotation of a particular one of the servers 104 as the Red server and the other as the Blue server is arbitrary, as the roles of these servers may be reversed in the protocols to be described herein.

Although only a single client is shown in FIG. 1, it is expected that a practical implementation of the system 100 will support a substantially larger number of clients. Similarly, although only a single pair of servers is shown in FIG. 1, a system in accordance with the invention may include many such pairs of servers, as well as other arrangements of servers, e.g., a general number n of servers, where n≥2. The invention is therefore not restricted as to the particular number of client or server devices, nor does the invention require any particular pairings or other arrangement of server devices within the system.

The client 102 may represent a lightweight device, such as a mobile telephone, PDA, game console, etc. The client 102 may alternatively represent a desktop or laptop personal computer (PC), a microcomputer, a workstation, a mainframe computer, a wired telephone, a facsimile machine, a television set top box, or any other information processing device which can benefit from the secure authentication techniques of the invention. The client 102 may therefore also be implemented as a server. In other words, the invention, although particularly well-suited for use in applications in which roaming lightweight client devices authenticate themselves to servers, can be used for the secure authentication of any type of information processing device, including a device that is itself a server.

The client 102 may also be referred to herein as a user. The term "user" should be understood to encompass either a client device, a person utilizing or otherwise associated with the device, or both. An operation described herein as being performed by a user may therefore be performed by a device, a person utilizing or otherwise associated with the device, or by both the user and the device. Similarly, a password associated with a device may be a password of a user of the device. In this case, the password may be temporarily associated with the device upon entry of the password into the device by the user, as in the case of a device that serves multiple users each having different passwords.

The servers 104R and 104B may be implemented as otherwise conventional servers programmed to perform the secure authentication functions described herein, or as other types of suitably-programmed information processing devices.

The network 106 may represent a global computer network such as the Internet, a wide area network (WAN), a local area network (LAN), a satellite network, a telephone or cable network, or various portions or combinations of these and other types of networks.

As is apparent from the foregoing, the system 100 as illustrated in FIG. 1 may be viewed more generally as a system having at least three processing devices which are configured to communicate with one another and in which a given one of the devices authenticates itself to the other devices. The particular "client" and "server" labels provided for devices in FIG. 1 should thus be considered as examples only, and not limitations of the invention.

Figure 2:
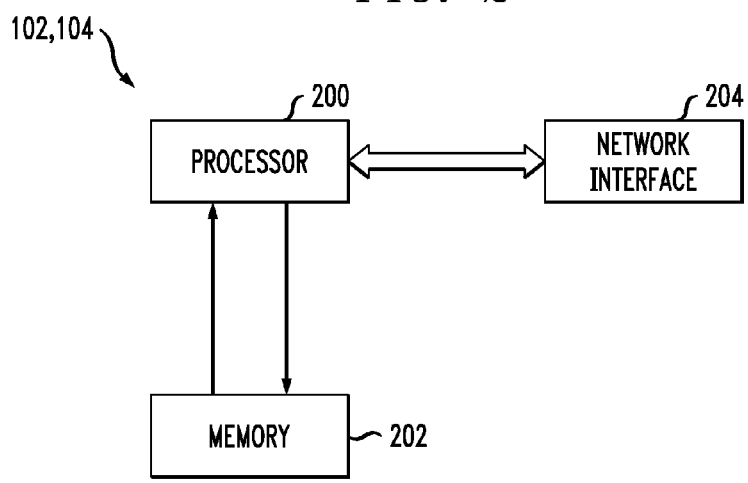
FIG. 2 illustrates one possible implementation of a given one of the client or server devices of the FIG. 1 system.

FIG. 2 shows one possible implementation of a given one of the processing devices 102, 104R, or 104B of the FIG. 1 system. The device in this implementation includes a processor 200 coupled to a memory 202 and a network interface 204. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 202 and executed by the corresponding processor 200. The memory 202 is also used for storing information used to perform computations or other operations associated with the secure authentication protocols of the invention.

As indicated previously, the present invention in accordance with one aspect thereof provides secure authentication techniques in which one device, such as client 102 of system 100 in FIG. 1, authenticates itself to a pair of other devices, such as servers 104R and 104B of the system 100. An example two-server secure authentication protocol in accordance with a first illustrative embodiment of the invention will be described below in conjunction with FIGS. 3 through 5.

For a more detailed discussion of multi-server authentication, see, for example, U.S. Pat. No. 7,725,730, entitled "Cryptographic Methods and Apparatus for Secure Authentication," or U.S. patent application Ser. No. 13/404,737, filed Feb. 24, 2012, entitled "Method and Apparatus for Authenticating a User Using Multi-Server One-Time Passcode Verification," (Now U.S. Pat. No. 9,118,661), each incorporated by reference herein.

Two-Server Secure Authentication Protocol

Figures 3, 4:
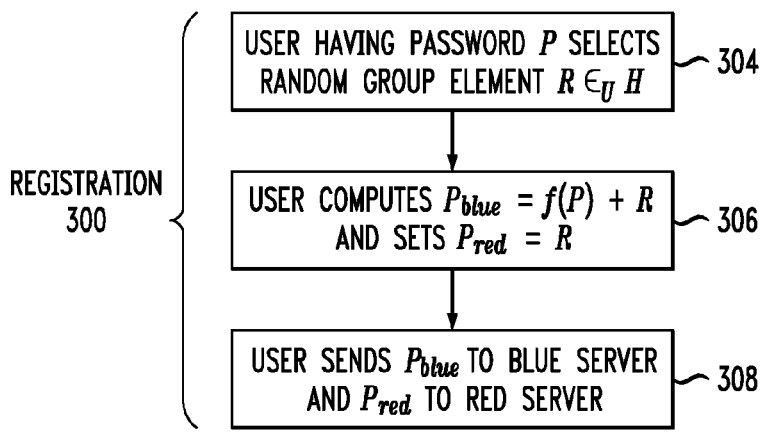
FIG. 3 is a flow diagram showing an exemplary multi-server registration process that incorporates aspects of the present invention.
FIG. 4 illustrates sample tables from exemplary multi-server proactivization databases that incorporate aspects of the present invention.

FIG. 3 illustrates an exemplary two-server secure registration process 300 in accordance with a first illustrative embodiment of the invention. In this embodiment, a user associated with client 102 of FIG. 1 registers itself with the pair of servers 104R and 104B. As noted above, operations indicated as being performed by the user may be performed at least in part by the associated client device. As shown in FIG. 3, during the registration process 300, the user splits a password P into shares for the two servers.

A presented password P' is an example of what is more generally referred to herein as "additional information," and in this illustrative embodiment represents information submitted by the user or an associated device subsequent to registration of the password P. It should be understood, however, that "additional information," as the term is used herein, may be any type of information.

The illustrative embodiment of FIG. 3 is configured such that each of the shares of the password P has the property that it is infeasible to determine solely from the given share correspondence of the password P' with the password P. As indicated above, in the authentication portion, the two servers utilize the respective first and second shares to collectively determine the correspondence of the password P' with the password P. The term "correspondence" as used in this context herein is intended to include, by way of example and not limitation, full or exact correspondence between first and second pieces of information, or partial correspondence indicating, e.g., that a relationship exists between first and second pieces of information beyond that which would be present if the pieces of information were simply selected at random.

It should be noted that a given password may be preprocessed by a client device using conventional techniques before it is submitted to the registration and authentication portions of the FIG. 3 protocol. The resulting output of such a preprocessing operation is also referred to herein as a password.

The term "password" as used herein is thus intended to be construed broadly so as to include, by way of example and without limitation, any piece of data suitable for use in authentication, such as an actual word, a sequence of numbers, letters or other symbols, a binary code, a cryptographic key, a personal identification number (PIN), a secret, a passcode, an answer to a life question or a set of such answers, a user profile or a portion thereof, one or more values associated with an RSA SecurID® token, or the like.

The term "share" is intended to include, by way of example and without limitation, a portion of a password.

The registration process 300 includes steps 304, 306 and 308. Let H be a large group (of, e.g., 160-bit order), and + be the group operator. Let f be a collision-free hash function f: $\{0, 1\}^* \rightarrow H$. The user generates a random number R. In step 304, the user selects a random group element $R \in_U H$. The user in step 306 then computes the share $P_{blue}$ for the Blue server 104B as $P_{blue} = f(P) + R$, while the share $P_{red}$ of the Red server 104R is set to R. In step 308, the shares $P_{blue}$ and $P_{red}$ are sent to the respective Blue and Red servers for storage. Observe that the share of either server individually provides no information about the password P.

It should be noted that legacy data may be converted into shares and loaded into the servers in a straightforward manner by simulating the above-described registration portion of the protocol. Such legacy data may also generally be converted into shares in other roaming authentication protocols via this same simulation approach. It is noted that in an exemplary embodiment, H is the group consisting of 160-bit strings with an XOR operation as the group operator.

Proactivization Journaling

As previously indicated, proactive security techniques update split secret values used by at least two authentication servers. According to one aspect of the invention, a version number is associated with the $P_{blue}$ and $P_{red}$ values when they are stored on the Blue and Red servers 104B, 104R. The version number needs to be the same number across the Blue and Red servers 104B, 104R. In one exemplary embodiment, the Blue and Red servers 104B, 104R coordinate to have a "current" version number, and all new secrets would be imbued with that version number. Hence, the values stored in the database could be seen as $P_{blueVersionN}$ and $P_{redVersionN}$.

In addition, the exemplary Blue and Red servers 104B, 104R agree on (i) a new secret value T in Group H that is used to update all values; and (ii) a new version number. Typically, version numbers are monotonically increasing. The proactivization of authentication secrets stored by the exemplary Blue and Red servers 104B, 104R can be expressed as follows:

To update $P_{blue}, P_{blueVersionN+1} = P_{blueVersionN} + f(T)$

To update $P_{red}, P_{red}, P_{redVersionN+1} = P_{redVersionN} + f(T)$

In one exemplary embodiment, the proactivization of authentication secrets stored by the exemplary Blue and Red servers 104B, 104R can employ an exclusive OR function (XOR) as follows:

To update $P_{blue}, P_{blueVersionN+1} = P_{blueVersionN} XOR\ T$

To update $P_{red}, P_{redVersionN+1} = P_{redVersionN} XOR\ T$

FIG. 4 illustrates exemplary multi-server proactivization tables 400-RED and 400-BLUE that incorporate aspects of the present invention. As shown in FIG. 4, each of the exemplary Red and Blue servers 104R, 104B store a corresponding proactivization table 400-RED and 400-BLUE, respectively. Each proactivization table 400-RED and 400-BLUE comprises one or more rows that each correspond to a secret value, such as Secret1 through Secret3. For each stored secret value, a plurality of versions are stored, each identified by a version number, such as version N and version N+1.

In the exemplary tables 400-RED and 400-BLUE shown in FIG. 4, the exemplary Red server 104R is in the midst of proactivizing and creating Version N+1 secrets. Meanwhile, the exemplary Blue server 104B has completed proactivizing all values in its database 400-BLUE, creating Version N+1 secrets. Either of the exemplary Red or Blue servers 104R, 104B could complete proactivization first. The authentication and data retrieval schemes described herein ensure various possible situations are handled correctly.

Figure 5:
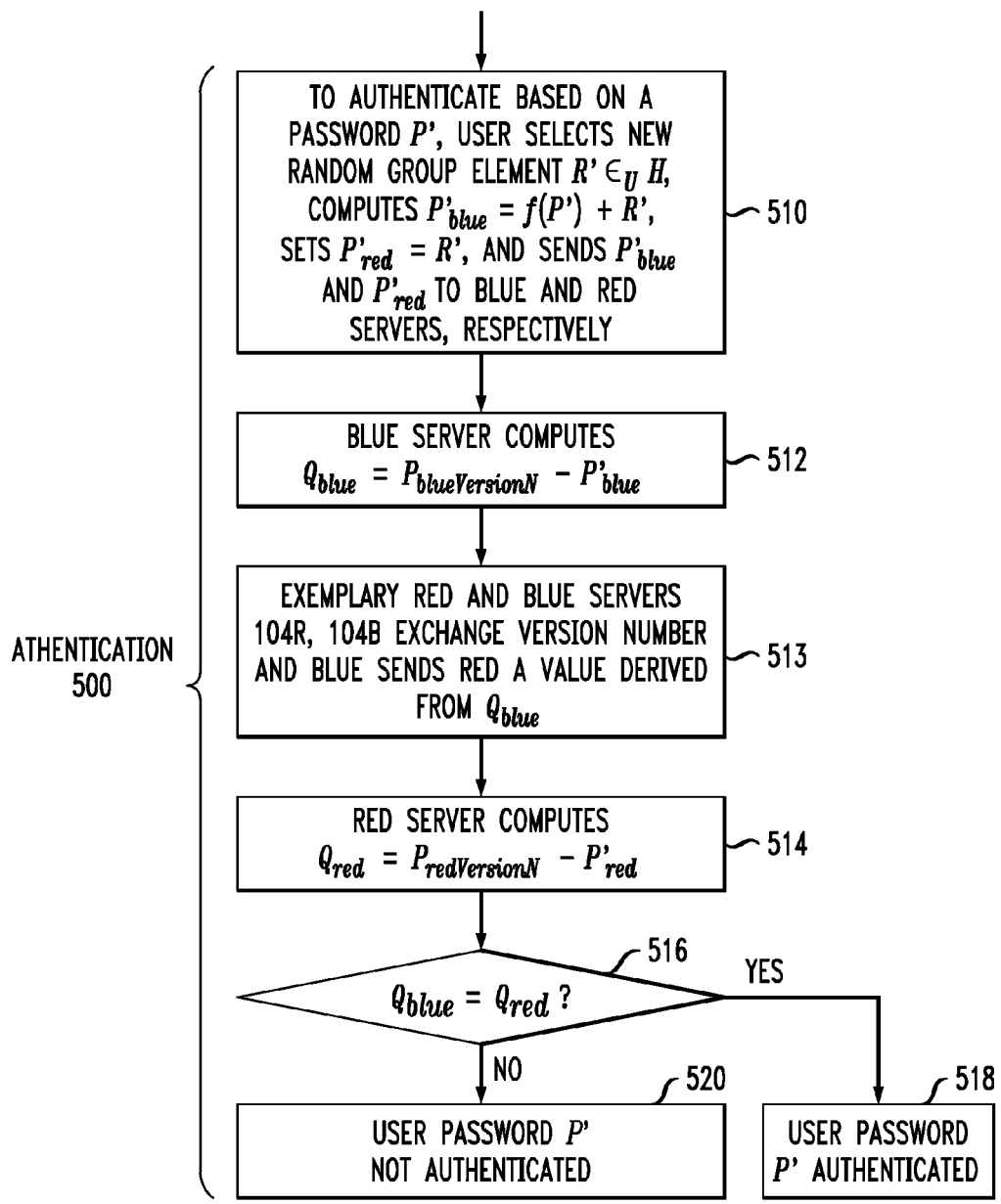
FIG. 5 is a flow diagram showing an exemplary multi-server authentication process that incorporates aspects of the present invention.

FIG. 5 illustrates an exemplary two-server secure authentication process 500 in accordance with a first illustrative embodiment of the invention. In this embodiment, a user associated with client 102 of FIG. 1 authenticates itself with the pair of servers 104R and 104B. During the authentication process 500, on presenting password P' for subsequent authentication, the user provides the two servers with a new, random sharing of P'. The authentication process 500 determines if the password P' is substantially equivalent to the registered password P. More particularly, as part of the authentication portion of the process in this illustrative embodiment, the servers compare the two sharings of P and P' in such a way that they learn whether P=P', but no significant additional information, even if one of the servers tries to cheat.

The authentication process 500 of the secure authentication protocol includes steps 510 through 520. In step 510, the user initiates authentication based on the password P' by selecting a new random group element $R' \in_U H$, computing $P'_{blue} = f(P') + R'$, setting $P'_{red}$ to R', and sending P' blue and $P'_{red}$ to the Blue and Red servers 104B and 104R, respectively. Thus, the user generates a random number R' that is the same length as the candidate password P' (or a message digest of P' if message digesting is used).

The Red and Blue servers then combine the shares provided to them during registration with those provided to them for authentication as follows. In step 512, the Blue server computes $Q_{blue} = P_{blueversionN} - P'_{blue} = (f(P) - f(P')) + (R - R')$. In addition, during step 513, the exemplary Red and Blue Servers 104R, 104B exchange the version number N of the secret values that will be used for the authentication and the Blue server 104B sends the Red server 104R a value derived from $Q_{blue}$ (used in the equivalence test of step 516). It is noted that step 513 can be performed at any point prior to when the second server (Red in FIG. 5) computes its Q value. The version number can be established by one of the exemplary Red and Blue Servers 104R, 104B or by means of a mutual communication.

During step 514, the Red server similarly computes $Q_{red} = P_{redversionN} - P'_{red} = R - R'$. The Red server 104R then sends the Blue server 104B a value derived from $Q_{red}$ (used in the equivalence test of step 516). Observe that if P=P', i.e., if the user has provided the correct password, then $f(P)$ and $f(P')$ cancel, so that $Q_{blue} = Q_{red}$. Otherwise, by the collision intractability of $f$, the result is that $Q_{blue} \neq Q_{red}$. Thus, in order to test the user password submitted for authentication, the two servers need merely test, as indicated in step 516, whether $Q_{blue} = Q_{red}$, preferably without revealing any additional information. The equivalence test performed during step 516 can comprise, for example, an equivalence protocol such as the one described in U.S. Pat. No. 7,725,730. If the test in step 516 confirms that $Q_{blue}=Q_{red}$, the user password P' is accepted and the authentication is complete, as indicated in step 518, and otherwise the password is rejected and the authentication fails, as indicated in step 520.

It should be noted that other embodiments of the invention may be configured to determine authenticity based on substantial equivalence, rather than exact equivalence as previously described.

Further, if the Blue server 104B, for example, does not have PblueVersionN, then the Blue server 104B has a number of options. If the Blue server 104B is in the midst of proactivizing to create VersionN secrets, then the specific value that is being authenticated could be proactivized immediately, and then the resulting value could be used for authentication. If the value doesn't exist (it may previously have existed), then the Blue server 104B fails the equivalence protocol.

Data Secret Registration

The use of the above authentication protocol can also be extended for the split storage of data secrets. Consider a user having data K in Group H. Based on the authentication of a split secret P', the user stores the data K on the Blue and Red servers 104B and 104R, as follows:

Generate a random number R in Group H having the same length as K.

Compute: $K_{blue}=K+R$

Set $K_{red}=R$

Store $K_{blue}$ and $K_{red}$ on the Blue and Red servers 104B and 104R, respectively.

Similar to when storing authentication secrets (FIG. 3), a version number is associated with the $K_{blue}$ and $K_{red}$ values when they are stored on the Blue and Red servers 104B and 104R.

The version number needs to be the same number across the Blue and Red servers 104B and 104R. Typically, the Blue and Red servers 104B and 104R coordinate the version number to have a "current" version number, and all new secrets would be imbued with that version number.

Data Secret Fetching

The user authenticates as shown above (FIG. 5), and then is given access to the split data secret. The version of the data returned to the user is the same as the version number used for the split authentication. The user reassembles their data by calculating:

$$K=K_{blueVersionN}+K_{redVersionN}$$

Data Secret Proactivization

In a similar manner as the proactivization of authentication secrets (FIG. 4), the Blue and Red servers 104B and 104R agree on a new secret value U in Group H for updating all values and agree on a new version number. Typically, version numbers are monotonically increasing. The proactivization of data secrets stored by the exemplary Blue and Red servers 104B, 104R can be expressed as follows:

To update $K_{blue}, K_{blueVersionN+1}=K_{blueVersionN}+f(U)$

To update $K_{red}, K_{redVersionN+1}=K_{redVersionN}+f(U)$.

Extensions

As described above, the function $f$ maps a password to a large group. In practice, this may be accomplished with a hash function, appropriately modified so that its output is in the designated group. For instance, if H is the group of 160-bit strings under the bitwise XOR operation, then a 160-bit hash function would be appropriate. Alternatively, if H is a multiplicative group with 160-bit elements, then some modular reduction may need to be applied to the output of the hash function. If H is a group with longer elements (e.g., 1024-bit elements) than the output of the hash function, then some expansion of the output of the hash function may be needed. One way to achieve the expansion is to apply a mask generation function such as MGF1, in RSA Laboratories' Public-Key Cryptography Standard (PKCS) #1, Version 2.1, June 2002, available at http://www.rsasecurity.com/rsalabs/pkcs/.

In addition to the password, other inputs may be provided to the function $f$. The input may also include a non-secret salt value, as is conventional as a countermeasure against dictionary attacks. The non-secret salt value could be generated by the client or one of the servers during the registration process 300, stored with other information about the user at one of the servers, and provided to the client during the authentication process 500. The input may also include other fixed parameters such as the user's name and the name of the servers to associate the output of the function $f$ with those parameters.

In the foregoing, it has been assumed that the function $f$ is one-way. However, it is also possible to construct a system in which the function $f$ is invertible. The advantage of such a construction is that the password P (or other secret) can be recomputed from the shares $P_{blue}$ and $P_{red}$. In this case, the function $f$ would map the password P to a group element in an invertible fashion. If H is the group of 160-bit strings under the bitwise XOR operation, and P is shorter than 160 bits, then a simple padding format would be appropriate.

In practice, the client 102 has a number of options for providing values such as R and R' to Red. As one example, the client may distribute the value directly to Red through a private channel established with Red under Red's public key. As another, the client may establish a "base" value through a private channel, where the client and Red derive one or more values such as R or R' from the base value via a one-way function. This latter option has the advantage that the client and Red need only establish one base value during a given session, from which multiple values such as R and R' may be derived. For instance, if there are multiple life questions, a different value may be derived from the same base value by including a question index in the input to the one-way function. If the client makes multiple attempts to answer a life question during a given session, a different value may be derived for each attempt by including an attempt index in the input to the one-way function. More specifically, a value $R'_{ij}$ for the $i^{th}$ question, $j^{th}$ attempt may be obtained by applying a one-way function to the base value and the indices i and j.

If Red has an RSA public key (n, e) where n is the modulus and e is the public exponent, one way to establish a base value is through a variant of the RSA-KEM technique described in V. Shoup, "A Proposal for an ISO Standard for Public Key Encryption (Version 2.1)," http://shoup.net/papers/, Dec. 20, 2001, which is incorporated by reference herein. In this variant, the client generates a random integer r between 0 and n−1, encrypts r with Red's public key to obtain $c=r^e \mod n$, and sends c to Red. A base value may now be derived from the integer r via a one-way function. Red decrypts c with its private key to recover r and similarly derives a base value.

Alternatively, the integer r itself may be considered as the base value. Analogous techniques are possible based on other public-key cryptosystems.

In all the foregoing examples, other parameters may be included in the input to the one-way function, such as the names of Red and Blue, a timestamp, Red's public key, the ciphertext c, and so on, as is generally considered beneficial to associate the derived values with the parameters.

Note that in the FIG. 3 and FIG. 5 protocols, the client is not required to perform any significant cryptographic computation. The protocol is therefore well-suited for use with lightweight client devices. It should be noted, however, that the client may perform some cryptographic computation to establish secure connections with the Red and Blue servers. For example, if the well-known secure sockets layer (SSL) approach is used in establishing connections between the client and the servers, the RSA encryption utilized would involve just a small number of modular multiplications. Moreover, once the client has submitted the shares in step 510, it need have no further involvement in the authentication portion of the process. The Red and Blue servers 104 together decide on the correctness of the password submitted for authentication. Given a successful authentication, one or both of these servers 104 can then perform one or more post-authentication actions on behalf of the user. For example, each server 104 can send a share of a private key for the user, the two servers 104 can issue separate pieces of a signed credential, or the servers 104 can jointly produce a digital signature or credential, etc.

As mentioned previously herein, the above-described embodiments of the invention are presented by way of illustrative example only. Numerous variations and other alternative embodiments may be used. For example, while the invention has been illustrated using two (Blue and Red) exemplary authentication servers 150, the invention may be extended into a k-out-of-N framework, ensuring security against an adversary capable of compromising up to k of N in total authentication servers 150 in any epoch.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

Aspects of the present invention recognize that without version numbers and perfect synchronization, the Red server 104R might have proactivized a secret value and the Blue server 104B might not have proactivized the equivalent secret value on the Blue Server 104B. This would lead to false authentication failures of Authentication secrets and the returning of incorrect Data secrets.

When the Red and Blue servers 104R, 104B perfectly synchronize when they proactivize each secret, they are guaranteed that the values used by the Red and Blue servers 104R, 104B for Authentication secrets or Data secrets are in step. The values can be used to do a valid authentication. However, synchronizing the proactivization of each secret value has significant performance implications, greatly increasing the CPU load and time to proactive a database of secrets. This causes this solution to not be scalable.

When the Red and Blue servers 104R, 104B use version numbers with their Authentication and Data secrets, then the Red and Blue servers 104R, 104B do not need to perfectly synchronize the proactivization of each secret. Using version numbers, the Red server 104R can tell the Blue server 104B which version of the secret needs to be used in the authentication or data retrieval operation.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with time-varying credentials, such as token codes, or authentication information, and other types of access-controlled resources. Also, the particular configuration of system elements shown in FIGS. 1 and 2, and their interactions as shown in FIGS. 3 through 5, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authenticating information in a system comprising a plurality of processing devices each adaptable for communication with one or more of the other devices, the method comprising the steps of:

generating at least first and second shares of a first password associated with a first device of the plurality of devices;

storing the first and second shares in respective second and third devices of the plurality of devices;

updating the first and second shares using a secret value;

assigning a version number to said updated first and second shares; and upon submission of additional information associated with the first device to at least one of the second and third devices, the second and third devices (i) exchange a given version number for the respective updated first and second shares during the authentication, and (ii) utilize the respective updated first and second shares for said given version number to collectively determine a correspondence of the submitted additional information with the first password.

2. The method of claim 1, wherein third and fourth shares are computed by the respective second and third devices as a function of their respective first and second shares and at least a portion of the submitted additional information.

3. The method of claim 1, wherein the submitted additional information comprises a third share and a fourth share, the third share being delivered by the first device to the second device, the fourth share being delivered by the first device to the third device.

4. The method of claim 1, wherein the first device comprises a client device and wherein the second and third devices comprise respective first and second servers connectable to the client device over a network.

5. The method of claim 1, wherein the generating and storing steps provide a registration of the first password for subsequent authentication of the submitted additional information.

6. The method of claim 1, wherein the first and second shares comprise respective first and second elements in an algebraic group, the composition of said first and second elements under an operator of said group yielding a representation of the first password.

7. The method of claim 4, wherein the submitted additional information comprises third and fourth shares of a second password associated with the client device and wherein the first and second servers accept the submitted additional information as authentic if a first quantity and a second quantity are determined to be substantially equivalent, wherein the first quantity is generated by the first server as a function of the first and third shares and the second quantity is generated by the second server as a function of the second and fourth shares.

8. The method of claim 1, wherein the first and second shares each comprise a representation of a corresponding information element from a set of information for one or more users, such that no single one of at least the second and third devices can feasibly determine the entire set of information.

9. The method of claim 1, wherein the version numbers are monotonically increasing.

10. The method of claim 1, wherein the step of updating the first and second shares comprises adding a hashed version of the secret value to a prior version of the first and second shares.

11. The method of claim 1, wherein the step of updating the first and second shares comprises applying an exclusive OR function (XOR) to the secret value and a prior version of the first and second shares.

12. The method of claim 1, further comprising the step of updating one or more of the first and second shares using the secret value if a desired version number does not exist.

13. The method of claim 1, further comprising the steps of storing a first portion of a data secret on the second device with a version number and a second portion of the data secret on the third device with the version number and updating the first and second portions using a second secret value.

14. The method of claim 13, further comprising the steps of authenticating the first device and providing the first and second portions for a given version number to the first device for reassembly of the data secret.

15. An apparatus for authenticating information in a system comprising a plurality of processing devices each adaptable for communication with one or more of the other devices, the apparatus comprising:
- a memory; and
- at least one hardware device, coupled to the memory, operative to:
  generate at least first and second shares of a first password associated with a first device of the plurality of devices;
  store the first and second shares in respective second and third devices of the plurality of devices;
  update the first and second shares using a secret value;
  assign a version number to said updated first and second shares; and
  upon submission of additional information associated with the first device to at least one of the second and third devices, the second and third devices (i) exchange a given version number for the respective updated first and second shares during the authentication, and (ii) utilize the respective updated first and second shares for said given version number to collectively determine a correspondence of the submitted additional information with the first password.

16. The apparatus of claim 15, wherein the generation and storage of the first and second shares provide a registration of the first password for subsequent authentication of the submitted additional information.

17. The apparatus of claim 15, wherein the version numbers are monotonically increasing.

18. The apparatus of claim 15, wherein the first and second shares are updated by adding a hashed version of the secret value to a prior version of the first and second shares.

19. The apparatus of claim 15, wherein the first and second shares are updated by applying an exclusive OR function (XOR) to the secret value and a prior version of the first and second shares.

20. The apparatus of claim 15, wherein said at least one hardware device is further configured to update one or more of the first and second shares using the secret value if a desired version number does not exist.

21. The apparatus of claim 15, wherein said at least one hardware device is further configured to store a first portion of a data secret on the second device with a version number and a second portion of the data secret on the third device with the version number and update the first and second portions using a second secret value.

22. The apparatus of claim 21, wherein said at least one hardware device is further configured to authenticate the first device and provide the first and second portions for a given version number to the first device for reassembly of the data secret.

23. An article of manufacture for authenticating information in a system comprising a plurality of processing devices each adaptable for communication with one or more of the other devices, comprising a tangible machine readable recordable medium containing one or more programs which when executed implement the steps of:
- generating at least first and second shares of a first password associated with a first device of the plurality of devices;
- storing the first and second shares in respective second and third devices of the plurality of devices;
- updating the first and second shares using a secret value-T;
- assigning a version number to said updated first and second shares; and
- upon submission of additional information associated with the first device to at least one of the second and third devices, the second and third devices (i) exchange a given version number for the respective updated first and second shares during the authentication, and (ii) utilize the respective updated first and second shares for said given version number to collectively determine a correspondence of the submitted additional information with the first password.

* * * * *